United States Patent
Yuan et al.

(10) Patent No.: US 11,308,786 B2
(45) Date of Patent: Apr. 19, 2022

(54) METHOD AND APPARATUS FOR REAL-TIME DATA ANALYSIS OF WATER PIPE NETWORK

(71) Applicants: HEFEI INSTITUTE FOR PUBLIC SAFETY RESEARCH, TSINGHUA UNIVERSITY, Anhui (CN); OPERATION AND MONITORING CENTER FOR HEFEI URBAN SAFETY & SECURITY, Anhui (CN)

(72) Inventors: Hongyong Yuan, Anhui (CN); Zhengxing Wang, Anhui (CN); Ming Fu, Anhui (CN); Guofeng Su, Anhui (CN); Lingshun Xu, Anhui (CN); Weihao Wang, Anhui (CN); Peng Wang, Anhui (CN)

(73) Assignees: HEFEI INSTITUTE FOR PUBLIC SAFETY RESEARCH, TSINGUA UNIVERSITY, Hefei (CN); OPERATION AND MONITORING CENTER FOR HEFEI URBAN SAFETY & SECURITY, Hefei (CN)

( * ) Notice: Subject to any disclaimer, the term of this patent is extended or adjusted under 35 U.S.C. 154(b) by 0 days.

(21) Appl. No.: 17/208,379

(22) Filed: Mar. 22, 2021

(65) Prior Publication Data
US 2021/0209925 A1 Jul. 8, 2021

Related U.S. Application Data

(63) Continuation of application No. PCT/CN2019/108407, filed on Sep. 27, 2019.

(30) Foreign Application Priority Data

Sep. 27, 2018 (CN) .......................... 201811133354.8

(51) Int. Cl.
*G08B 21/00* (2006.01)
*G08B 21/18* (2006.01)
(Continued)

(52) U.S. Cl.
CPC ........... *G08B 21/182* (2013.01); *G06Q 50/06* (2013.01); *H04L 67/12* (2013.01)

(58) Field of Classification Search
CPC ....... G08B 21/182; G06Q 50/06; H04L 67/12
(Continued)

(56) References Cited

U.S. PATENT DOCUMENTS 6,317,051 B1 * 11/2001 Cohen ................. G01M 3/2807
340/606
10,942,080 B2 * 3/2021 Bailey .................... G01K 1/143
(Continued)

FOREIGN PATENT DOCUMENTS

CN 102235575 A 11/2011
CN 103839190 A 6/2014
(Continued)

*Primary Examiner* — Zhen Y Wu
(74) *Attorney, Agent, or Firm* — Novick, Kim & Lee, PLLC; Zhi Yang Xue; Jihun Kim (57) ABSTRACT

A method and an apparatus for real-time data analysis of water pipe network are proposed. The method includes: step S1: obtaining a current flow data $x_i$ to be identified, where i is a positive integer greater than or equal to 2; step S2: determining whether a first difference between the current flow data $x_i$ to be identified and a previous identified flow data $x_{i-1}$ adjacent to the current flow data $x_i$ to be identified is less than or equal to a preset threshold; step S3: determining whether a second difference between a next to-be-identified flow data $x_{i+1}$ adjacent to the current flow data $x_i$ to be identified and the previous identified flow data $x_{i-1}$ is less than or equal to the preset threshold in response to the first difference being greater than the preset threshold.

10 Claims, 5 Drawing Sheets

(51) Int. Cl.
*G06Q 50/06* (2012.01)
*H04L 67/12* (2022.01)

(58) Field of Classification Search
USPC .......................................................... 340/606
See application file for complete search history.

(56) References Cited

U.S. PATENT DOCUMENTS

| | | | |
|---|---|---|---|
| 11,021,376 B2* | 6/2021 | Johnson | G06N 7/005 |
| 2013/0041588 A1* | 2/2013 | Johnson | E21B 47/07 |
| | | | 702/12 |
| 2013/0085690 A1* | 4/2013 | Fei | E21B 47/10 |
| | | | 702/51 |
| 2015/0052979 A1* | 2/2015 | Cho | G01M 3/243 |
| | | | 73/40.5 A |
| 2015/0322773 A1* | 11/2015 | Johnson | G01F 1/68 |
| | | | 702/12 |
| 2015/0330863 A1* | 11/2015 | Dotan | F17D 5/06 |
| | | | 702/51 |
| 2017/0152648 A1* | 6/2017 | Hammond | G01F 1/66 |
| 2018/0010978 A1* | 1/2018 | Bailey | G01K 13/02 |
| 2018/0181111 A1* | 6/2018 | Cussonneau | G05B 17/02 |
| 2018/0238765 A1* | 8/2018 | Gramespacher | G01M 3/2815 |
| 2019/0128762 A1* | 5/2019 | Bailey | G01P 13/006 |
| 2019/0154637 A1* | 5/2019 | Kusumoto | G01N 29/4472 |
| 2020/0331772 A1* | 10/2020 | Johnson | G06N 7/005 |

FOREIGN PATENT DOCUMENTS

| | | |
|---|---|---|
| CN | 106287233 A | 1/2017 |
| CN | 109325692 A | 2/2019 |
| JP | 2001160043 A | 6/2001 |

\* cited by examiner

METHOD AND APPARATUS FOR REAL-TIME DATA ANALYSIS OF WATER PIPE NETWORK

CROSS-REFERENCE TO RELATED APPLICATION

The present application is a continuation application of International Application No. PCT/CN2019/108407, filed on Sep. 27, 2019, which is based upon and claims priority to Chinese Patent Application No. 201811133354.8, filed on Sep. 27, 2018, by HEFEI INSTITUTE FOR PUBLIC SAFETY RESEARCH TSINGHUA UNIVERSITY; OPERATION AND MONITORING CENTER FOR HEFEI URBAN SAFETY & SECURITY, entitled "REAL-TIME DATA ANALYSIS METHOD FOR PIPE NETWORK, AND DEVICE", the entirety contents of which are incorporated herein by reference.

FIELD

The present disclosure relates to the technical field of data analysis, in particular to a method and apparatus for real-time data analysis of a water pipe network.

BACKGROUND

At present, there are increasingly number of technologies locally and internationally that use front-end sensors to monitor pipe network indicators. However, due to the complex change rules of flow indicators and large fluctuation ranges, it is impossible to quickly identify abnormal situations by setting the threshold range.

SUMMARY

Embodiments of the present disclosure propose a method for real-time data analysis of water pipe network, which includes the following steps: step S1: obtaining a current flow data $x_i$ to be identified, where i is a positive integer greater than or equal to 2; step S2: determining whether a first difference between the current flow data $x_i$ to be identified and a previous identified flow data $x_{i-1}$ adjacent to the current flow data $x_i$ to be identified is less than or equal to a preset threshold, and waiting to be outputted in response to the first difference being less than the preset threshold; step S3: determining whether a second difference between a next to-be-identified flow data $x_{i+1}$ adjacent to the current flow data $x_i$ to be identified and the previous identified flow data $x_{i-1}$ is less than or equal to the preset threshold in response to the first difference being greater than the preset threshold, and waiting to be outputted after correction in response to the second difference being less than or equal to the preset threshold; step S4: determining whether a third difference between the current flow data $x_i$ to be identified and the next to-be-identified flow data $x_{i+1}$ is less than or equal to the preset threshold in response to the second difference being greater than the preset threshold, and waiting to be outputted in response to the third difference being less than or equal to the preset threshold; step S5: detecting changing trends of the previous identified flow data $x_{i-1}$, the current flow data $x_i$ to be identified and the next to-be-identified flow data $x_{i+1}$ in response to the third difference being greater than the present threshold, waiting to be outputted in response to the trend satisfying a preset condition, waiting to be outputted after correction in response to the trend not fails to satisfy the preset condition, and obtaining and outputting an analysis result after an output period is reached.

Embodiments of the present disclosure provide an apparatus for real-time data analysis of water pipe network, which includes: an obtaining module, configured to obtain a current flow data $x_i$ to be identified, where i is a positive integer greater than or equal to 2; a first determining module, configured to determine whether a first difference between the current flow data $x_i$ to be identified and a previous identified flow data $x_{i-1}$ adjacent to the current flow data $x_i$ to be identified is less than or equal to a preset threshold, and wait to be outputted in response to the first difference being less than the preset threshold; a second determining module, configured to determine whether a second difference between a next to-be-identified flow data $x_{i+1}$ adjacent to the current flow data $x_i$ to be identified and the previous identified flow data $x_{i-1}$ is less than or equal to the preset threshold in response to the first difference being greater than the preset threshold, and waiting to be outputted after correction in response to the second difference being less than or equal to the preset threshold; a third determining module, configured to determine whether a third difference between the current flow data $x_i$ to be identified and the next to-be-identified flow data $x_{i+1}$ is less than or equal to the preset threshold in response to the second difference being greater than the preset threshold, and wait to be outputted in response to the third difference being less than or equal to the preset threshold; a detecting module, configured to detect changing trends of the previous identified flow data $x_{i-1}$, the current flow data $x_i$ to be identified and the next to-be-identified flow data $x_{i+1}$ in response to the third difference being greater than the present threshold, wait to be outputted in response to the trend satisfying a preset condition, wait to be outputted after correction in response to the trend not fails to satisfy the preset condition, and obtain and output an analysis result after an output period is reached.

The additional aspects and advantages of the present disclosure will be partially given in the following description, and some will become obvious from the following description, or be understood through the practice of the present disclosure.

DESCRIPTION OF DRAWINGS

The above and/or additional aspects and advantages of the present disclosure will become obvious and easy to understand from the following description of the embodiments in conjunction with the accompanying drawings, in which.

DETAILED DESCRIPTION

The embodiments of the present disclosure are described in detail below. Examples of the embodiments are shown in the accompanying drawings, in which the same or similar reference numerals indicate the same or similar elements or elements with the same or similar functions.

In the related arts, abnormal flow fluctuations will inevitably cause changes in pipeline pressure. However, pressure fluctuations are relatively stable and the fluctuation range is not obvious. Most of the real-time monitoring technologies through pipeline pressure indicators can only monitor the obvious pressure fluctuations caused by abnormal flow. Small and frequent abnormal situations is hardly monitored and identified. However, most of the hidden dangers of the water pipe network are caused by the long-term accumulation of such small and frequent abnormal conditions that cannot be monitored and identified in time. Once the structural strength cannot withstand the pipeline pressure, accidents such as pipe bursts will occur, and even secondary derivative disasters will occur. For example, abnormal flow fluctuations caused by large users' irregular water use, opening and closing valves, and large flow flushing of pipelines generally have a short duration and a small impact range. The existing pressure monitoring technology cannot detect and identify all true abnormalities, which has disadvantages such as low accuracy and large errors.

Embodiments of the present disclosure digs deeply into historical monitoring big data, analyzes and summarizes the law of water pipe network flow changes, and provides references for technical research in related fields; through real-time monitoring, related algorithms are researched to quickly and accurately judge medium flow abnormalities and to process them, the hidden safety hazards in the operation of the water pipe network are identified in time to ensure the safe operation of the pipe network.

The urban underground pipe network is the lifeline of the city and an important guarantee for maintaining the daily life of the people. With the continuous development of the national economy, the urban population is densely populated and the underground pipeline network is intricate. Once the urban underground water pipe network leaks or bursts, it will scour the soil to form underground cavities, which will cause the road surface to collapse, which will have a huge impact on people's property safety, economic and social benefits. In order to manage the safe operation of the water pipe network scientifically, it is necessary to study a method based on real-time flow monitoring to quickly and accurately identify the abnormal operation of the water pipe network and deal with it accordingly, so as to provide technical support and decision-making services for the water supply dispatching and the safe maintenance of the pipe network.

Since pressure is a direct indicator of pipeline network accidents, in the field of water pipeline network safety operation monitoring, the existing real-time monitoring technology is mainly for real-time monitoring and alarming of pipe network media pressure indicators. Generally, the alarm and prompt function is issued directly by setting the pressure threshold range. Pipe network flow is closely related to pressure changes. Due to the large fluctuation range of flow indicators and complex changes, it is usually only suitable for comparative analysis of historical monitoring data. Currently, there is no technical method for online judgment of abnormal operation of pipe network based on real-time flow monitoring.

The embodiments described below with reference to the accompanying drawings are exemplary, and are intended to explain the present disclosure, but should not be construed as limiting the present disclosure.

The following describes a method and an apparatus for real-time data analysis of water pipe network according to the embodiments of the present disclosure with reference to the drawings. First, the method for real-time data analysis of water pipe network according to the embodiments of the present disclosure will be described with reference to the drawings.

Figure 1:
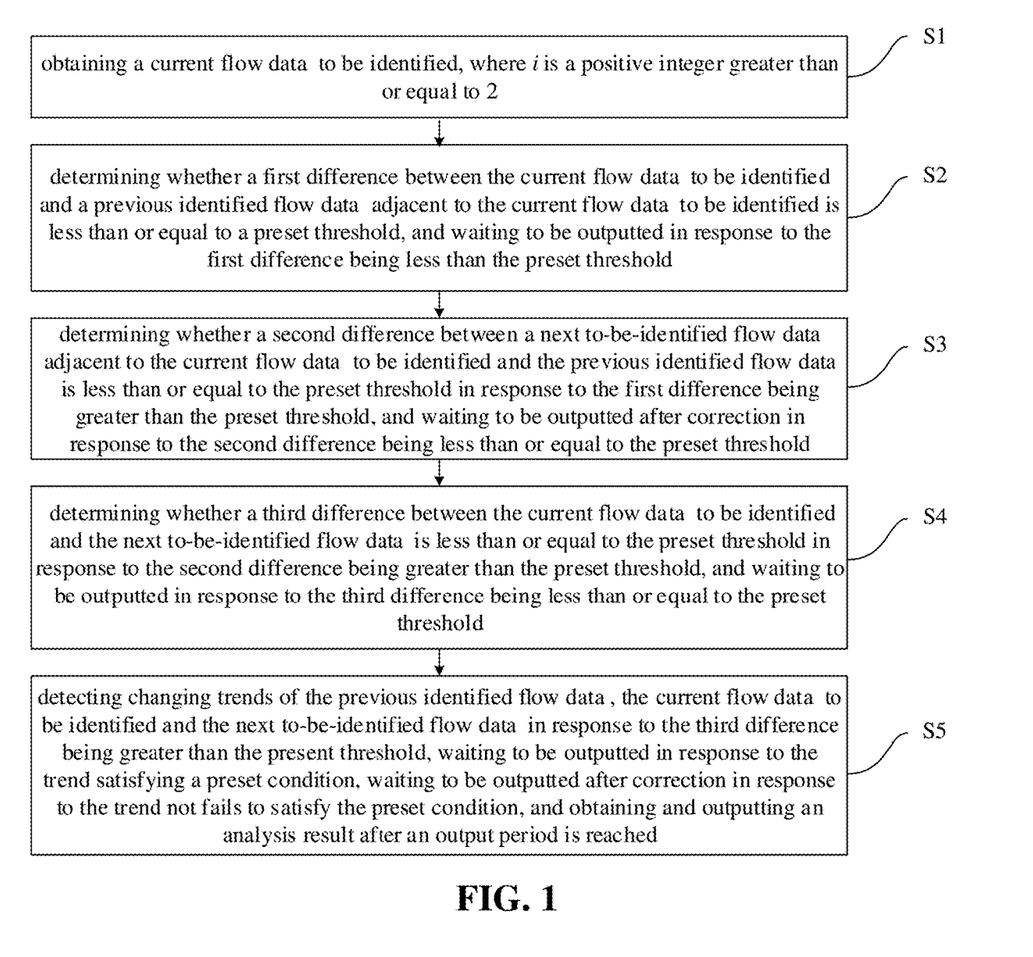
FIG. 1 is a flowchart of a method for real-time data analysis of water pipe network according to an embodiment of the present disclosure.

FIG. 1 is a flowchart of a method for real-time data analysis of water pipe network according to an embodiment of the present disclosure.

As shown in FIG. 1, the real-time data analysis method of the water pipe network includes the following steps:

Step S1: obtaining a current flow data $x_i$ to be identified, where i is a positive integer greater than or equal to 2.

It is understandable that the embodiment of the present disclosure can obtain the current flow data in real time, and obtain the next flow data to be identified after a short period of time, for example, obtain one flow data to be identified every 10 s, of course, the time of acquiring the specific flow data to be identified can be set by those skilled in the art according to actual needs. It is only used as an example and is not specifically limited. Obtaining a flow data to be identified at regular intervals can effectively ensure the real-time performance of data processing.

Step S2: determining whether a first difference between the current flow data $x_i$ to be identified and a previous identified flow data $x_{i-1}$ adjacent to the current flow data $x_i$ to be identified is less than or equal to a preset threshold, and waiting to be outputted in response to the first difference being less than the preset threshold.

It can be understood that the embodiment of the present disclosure determines whether the current flow data $x_i$ to be identified fluctuates within a normal range by judging whether the first difference is less than or equal to a preset threshold, that is, whether the current flow data $x_i$ to be identified is fluctuated in the expected range near the threshold. If yes, it means that the current flow data $x_i$ to be identified is normal, and as shown in path 1 in FIG. 2, the data is normal data fluctuation characteristics, and the data is within the threshold range. At this time, the data is waited for after automatic storage. If the first difference is greater than the preset threshold, it means that the current flow data $x_i$ to be identified does not fluctuate within the normal range, and further judgment is required.

It should be noted that the preset threshold is calculated by the embodiments of the present disclosure according to the historical water flow data of the preset number of days of continuous undistorted and normally fluctuating data, for example, sample training is performed through 7-day historical normal fluctuating monitoring data. The 3σ rule is used to calculate the adjacent value change threshold, and then the preset threshold is obtained. At the same time, due to changes in residential or industrial water demand, or other changes in water demand, the embodiments of the present disclosure can periodically update the preset threshold according to the actual situation to meet the current water demand, for example, the preset threshold will be updated after one or two months, and there is no specific limitation here.

Further, in an embodiment of the present disclosure, the identified flow data $x_i$ is a preset value.

It is understandable that at the beginning of data processing, since there is no identified flow data $x_{i-1}$, embodiments of the present disclosure ensures the completeness and accuracy of data processing by setting a preset identified flow data $x_1$, The preset identified flow data $x_1$ is a normally fluctuating data value, which can be set according to actual conditions, such as a preset threshold, of course, it can also be set to other normal fluctuating data values, which is not specifically limited here.

Step S3: determining whether a second difference between a next to-be-identified flow data $x_{i+1}$ adjacent to the current flow data $x_i$ to be identified and the previous identified flow data $x_{i-1}$ is less than or equal to the preset threshold in response to the first difference being greater than the preset threshold, and waiting to be outputted after correction in response to the second difference being less than or equal to the preset threshold.

It is understandable that when the current flow data $x_i$ to be identified does not fluctuate within the normal range, it is continued to determine whether the second difference is less than or equal to the preset threshold, and further determine whether the next flow data $x_{i+1}$ to be identified returns to normal fluctuations. That is, whether the next flow data $x_{i+1}$ to be identified fluctuates near the preset threshold, if so, the next flow data $x_{i+1}$ to be identified fluctuates back to normal fluctuations, and as shown in path 2 of FIG. 2, the data is sporadic distortion, it is quickly restored to the threshold range, which needs to be identified and corrected, at this time, waiting to be outputted after the correction. If the second difference is greater than the preset threshold, it means that the next to-be-identified flow data $x_{i+1}$ does not fluctuate within the normal range, and further judgment is required.

Step S4: determining whether a third difference between the current flow data $x_i$ to be identified and the next to-be-identified flow data $x_{i+1}$ is less than or equal to the preset threshold in response to the second difference being greater than the preset threshold, and waiting to be outputted in response to the third difference being less than or equal to the preset threshold.

It is understandable that when the next flow data $x_{i+1}$ to be identified does not fluctuate within the normal range, by judging whether the third difference is less than or equal to the preset threshold, it is further judged whether the next flow data $x_{i+1}$ to be identified is fluctuated within another reference range. If it is, as shown in path 3 of FIG. 2, the data is stable and fluctuates on another benchmark after the data is distorted. It conforms to the situation that the monitoring data is zero or the data drifts and is continuously distorted due to the abnormality of the equipment. The data is identified without correction, the alarm can be issued after a period of time, at this time, just store and wait for output. If the third difference is greater than the preset threshold, it means that the next to-be-identified flow data $x_{i+1}$ does not fluctuate steadily within another reference range, and further judgment is required.

Step S5: detecting changing trends of the previous identified flow data $x_{i-1}$, the current flow data $x_i$ to be identified and the next to-be-identified flow data $x_{i+1}$ in response to the third difference being greater than the present threshold, waiting to be outputted in response to the trend satisfying a preset condition, waiting to be outputted after correction in response to the trend not fails to satisfy the preset condition, and obtaining and outputting an analysis result after an output period is reached.

In embodiments of the present disclosure, the preset condition is that: the previous identified flow data $x_{i-1}$, the current flow data $x_i$ to be identified and the next to-be-identified flow data $x_{i+1}$ continues to rise or continue to fall.

Figure 2:
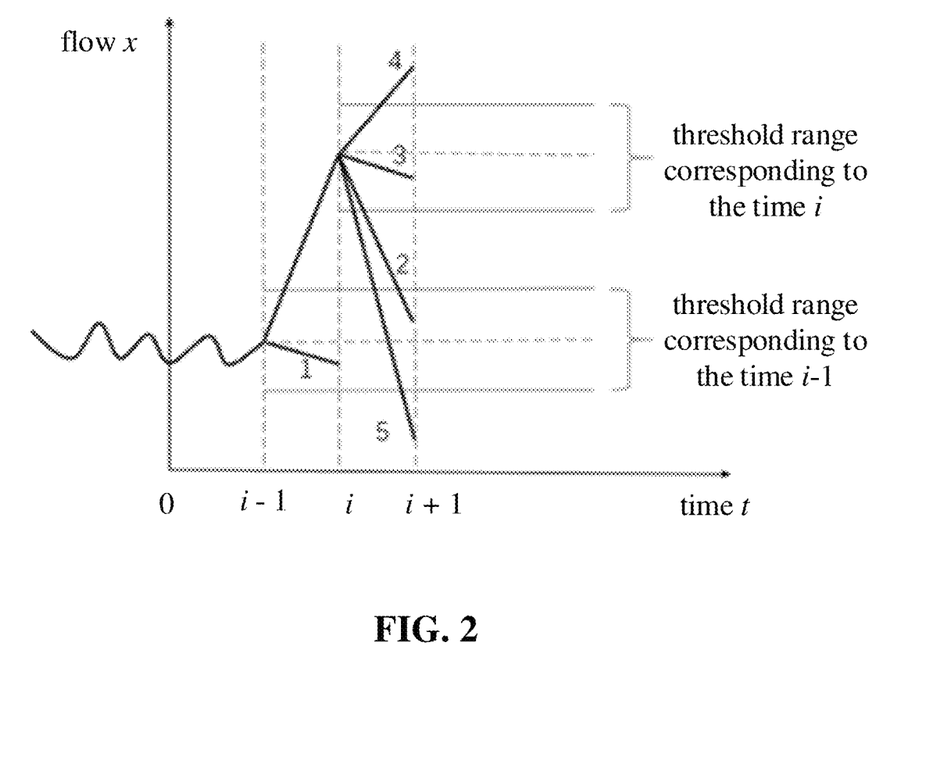
FIG. 2 is a model of monitoring the flow change rule according to an embodiment of the present disclosure.

It is understandable that when it is determined through the above steps that the next to-be-identified flow data $x_{i+1}$ does not fluctuate steadily within another reference range, then it may be continued to determine the changing trends of the previous identified flow data $x_{i-1}$, the current to-be-identified flow data $x_i$, and the next flow data $x_{i+1}$ to be identified, that is, to determine whether it continues to rise or fall. If yes, as shown in path 4 in FIG. 2, the value rises or falls drastically in a short period of time, which conforms a condition of water flow change characteristics such as the water consumption of large number of users, switch on or off the valve, burst pipes, etc. The monitored value may be outputted, without correction or elimination, just wait for the output at this time. If no, it may be in accordance with the situation of path 5 as shown in FIG. 2, and the data may be irregularly distorted, but the probability of this situation is small, so correct it and store the output.

It should be noted that in the above steps S1 to S5, when the output cycle is met, the data waiting to be output may be modified or outputted. For example, output every 1 minute, of course, it can also be output every 2 minutes, and the output cycle can be based on actual setting according to the use requirements, which are only used as an example, and are not specifically limited, so as to effectively ensure the accuracy of the identification and monitoring data change law in the algorithm and improve the reliability of data analysis.

Further, in an embodiment of the present disclosure, it further includes: detecting a current time, and in response to the current time satisfying a preset time period, determining the current to-be-identified flow data as a new previous identified flow data, and determining the next to-be-identified flow data as a new current flow data to be identified, and continuing to execute the step S1.

It is understandable that steps S1 to S5 are a data processing flow, which is continuously iterated and periodically run. For example, after the current data processing is completed, the next data continues to be processed according to the above steps, for example, one piece of data may be processed in 10 s, such that the flow data of the water pipe network may be monitored in real time and continuously, thereby identifying the hidden safety hazards in the water pipe network operation in time, and escorting the safe operation of the pipe network.

Further, in an embodiment of the present disclosure, it further includes: detecting whether the analysis result reaches an alarm condition; generating an alarm signal in response to reaching the alarm condition.

In an embodiment of the present disclosure, the acoustic prompting device and/or the optical display device may be controlled to give an alarm in response to the alarm signal.

Figure 3:
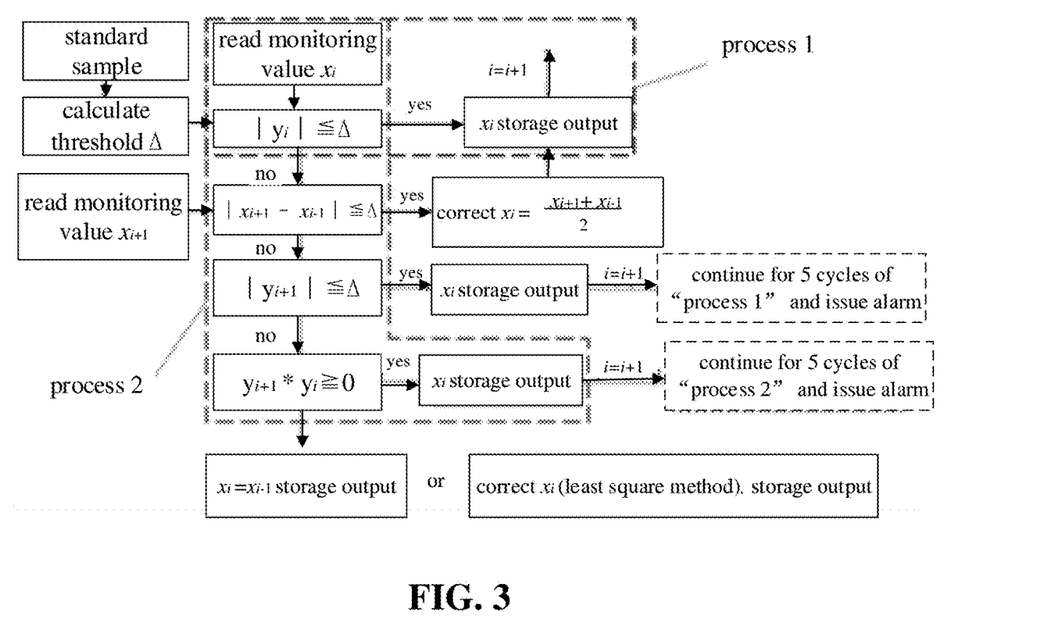
FIG. 3 is a flowchart of a method for real-time data analysis of water pipe network according to a specific embodiment of the present disclosure.

It is understandable that, as shown in FIG. 3, after the current flow data $x_1$ to be identified is output, it continues for 5 cycles of "Process 1", then an alarm can be issued; or the current flow data $x_1$ to be identified is output and continues for 5 cycles of "Process 2", then the alarm can be issued. Therefore, relevant personnel can be notified effectively and timely that there are hidden dangers in the operation of the water pipe network, and maintenance personnel can eliminate the hidden dangers in time to ensure the safety of the water pipe network.

The method for real-time data analysis of the water pipe network will be further elaborated below by means of specific embodiments.

As shown in FIG. 3, it specifically includes:

Step 1: using the 7-day historical normal fluctuation monitoring data for sample training, and using the 3σ rule to calculate the adjacent value change threshold Δ. As the demand for residential or industrial water consumption changes, the sample training may be performed again after every two months (or other time) and calculate a new threshold Δ.

The method of 3σ rule to calculate the dynamic change threshold Δ is described as follows:

a) selecting a piece of typical data that does not contain distorted data, such as 7-day data, and calculate the daily data changes separately:

$$y_i = x_i - x_{i-1} (i=2,3,\ldots,n) \quad (1),$$

where $x_i$ is the measured data, and $y_i$ is the data change.

According to the normal fluctuation trend of water supply data, the data changes are often evenly distributed around a certain value, and the central value approaches 0.

b) determining the extreme value of daily data changes

Euclidean distance is used as the distance between the data change and the zero point:

$$D_i = |y_i| (i=2,3,\ldots n) \quad (2),$$

The extreme value of daily data change may be obtained:

$$D_{max}(i) = \max(D_2, D_3, \ldots D_n), (i=1,2,\ldots 7) \quad (3),$$

c) calculating the statistical parameters of the extreme value of the 7-day data change The average value of the extreme value of the 7-day data change is calculated by:

$$\mu = \frac{\sum_{i=1}^{7} D_{max}(i)}{7}, \quad (4)$$

The standard deviation of the extreme value of the 7-day data change may be calculated by:

$$\sigma = \sqrt{\frac{\sum_{i=1}^{7} (D_{max}(i) - \mu)^2}{7}}, \quad (5)$$

d) determining the threshold of data change:

Using the 3σ rule (small probability event) to determine the threshold of data change:

$$|y_i| = D_i \leq \mu + 3\sigma = \Delta \quad (6).$$

Step 2: comparing Δ with the change values of $x_{i-1}$ and $x_i$ to determine whether $x_i$ is within the normal fluctuation range, if yes, storing and waiting to be outputted; if no, proceeding to the next step.

Step 3: comparing Δ with the change values of $x_{i-1}$ and $x_{i+1}$ to determine whether $x_{i+1}$ returns to normal fluctuations, if yes, correcting $x_i$ and storing and waiting to be outputted; if no, proceeding to the next step.

Step 4: comparing Δ with the change value of $x_i$, $x_{i+1}$ to determine whether $x_{i+1}$ fluctuates steadily within another reference range, if yes, storing $x_i$ and waiting to be outputted; if no, proceeding to the next step.

Step 5: comparing the changing trends of the three data $x_{i-1}$, $x_i$, $x_{i+1}$, and judge whether the trend continues to rise or continue to fall, if yes, store $x_i$ and waiting to be outputted; if no, correct $x_i$ and store and waiting to be outputted.

In all the above steps, the data collection and upload time are both 10 s, the collection and upload frequency are both 0.1 HZ, the adjacent value changes $y_i = x_i - x_{i-1}$; $x_{i-1}$ is the outputted value, $x_i$ is the current data which needs to be identified and waited to be outputted, $x_{i+1}$ is the last bit of data to assist in comparison and identification. In order to ensure the accuracy of the identification and monitoring data change rules in the algorithm, all current output values need to wait for 60 s (6 cycles are needed in total to meet the alarm principle) before being corrected, outputted or alarmed.

In the above step 3, after the $x_i$ is outputted, it continues for 5 cycles of "process 1", then the alarm can be issued; in the above step 4, after the $x_i$ is outputted, it continues for 5 cycles of the "process 2", then the alarm can be issued; the alarm form may be: when the monitoring data meets the alarm rules, the lifeline monitoring system immediately pushes the detailed alarm information to the main page of the system, and the sound and light alarm flashes and buzzes to immediately notify the 24-hour duty personnel.

The following uses a specific example to further elaborate the method for real-time data analysis of water pipe network.

Figure 4:
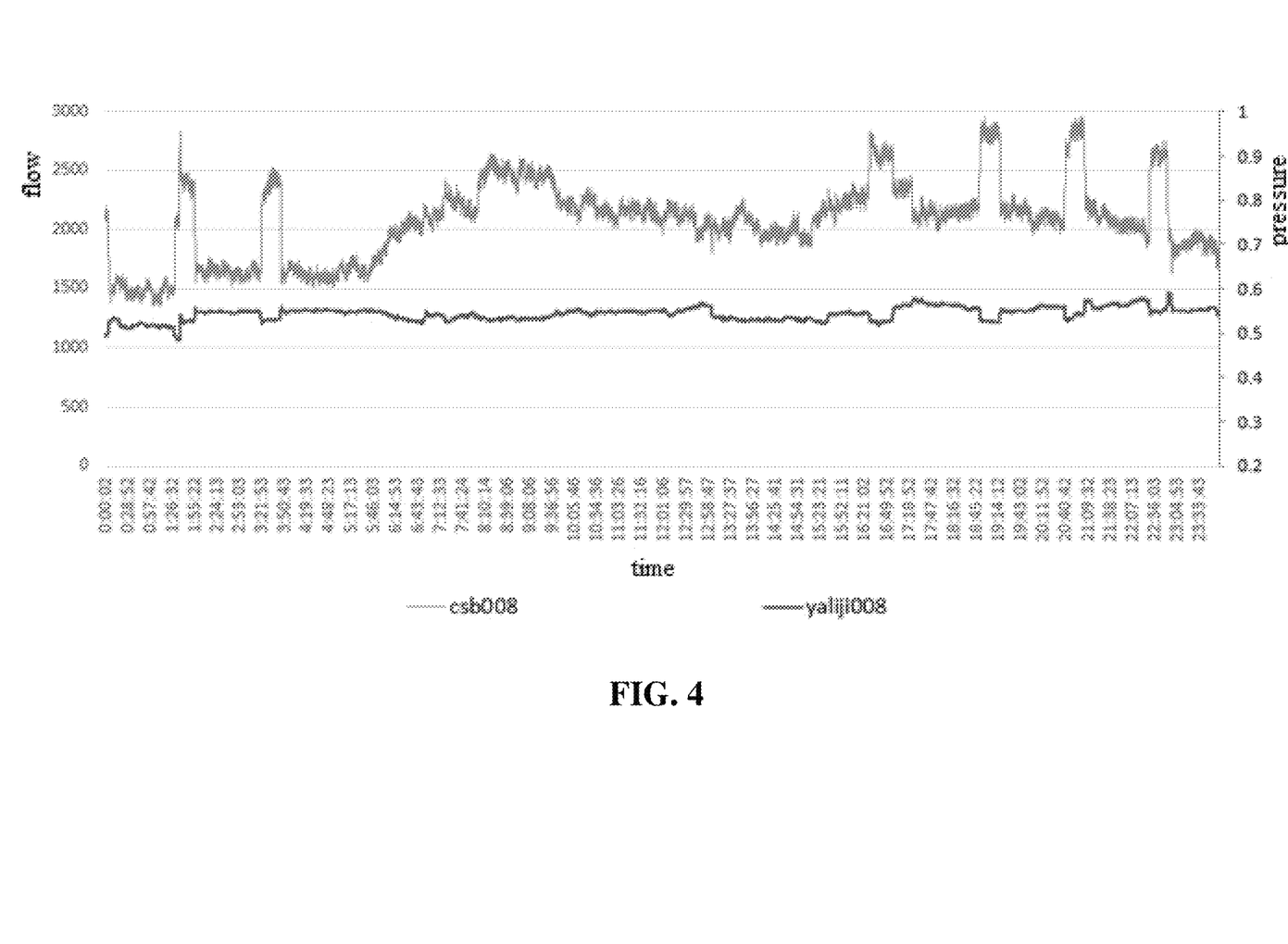
FIG. 4 is a flow pressure comparison diagram according to an embodiment of the present disclosure.

As shown in FIG. 4, the water used by a large user downstream of the pipeline caused changes in flow and pressure at the same monitoring point. The flow index has obvious fluctuations, and the pressure index does not change significantly and does not exceed the pressure threshold. According to the description of the pipe network operating company, the frequent sudden changes in the flow caused by the large user's water use have certain hidden dangers to the safe operation and scheduling management of the pipe network. The algorithm technology of the embodiment of the present disclosure compares adjacent monitoring data to identify change trends. Such abnormal flow fluctuations may be quickly identified and alarmed.

The abnormal fluctuation phenomenon in FIG. 4 cannot be identified by traditional pressure monitoring, and can only be identified by visual observation or manual comparison and analysis of historical data. The phenomenon in the figure takes at least half an hour to be identified; however, the algorithm in the embodiment of the present disclosure can be realized based on real-time flow abnormality monitoring and alarming, but in order to improve the accuracy of the alarm and reduce the false alarm rate, the embodiment of the present disclosure adopts multiple iterations with the upload frequency of 0.1 HZ and the 5 cycles illustrated in FIG. 3, which is 1 minute in total, so as to achieve the purpose of rapid identification.

In addition, the method of the embodiment of the present disclosure is applied to the urban lifeline monitoring system. The system composition is mainly divided into four parts: "sense", "transmission", "knowledge" and "use". The front-end sensing system monitors the flow rate and other indicators in real time. The transmission system uses the Internet of Things technology to transmit the front-end data to the collection platform, and finally the business system analyzes, processes and displays the data.

According to the method proposed in the embodiment of the present disclosure, the analysis result is obtained by analyzing and processing real-time water flow data, and any abnormal situation of the water pipe network operating state is quickly and accurately identified through the real-time change law of flow, and the change law of the water pipe network flow is analyzed and summarized. Based on real-time monitoring data, use the shortest time to judge the water use law, and use distortion recognition and correction technology to process, store and output abnormal data, which can quickly and automatically identify the flow change law of real-time monitoring data, and make relevant corrections and alarms. The method has good processing and display performance, the application is simple, the applicability is strong, the analysis and recognition accuracy is high, and the timeliness of emergency treatment is guaranteed.

Next, the apparatus for real-time data analysis of water pipe network according to the embodiment of the present disclosure will be described with reference to the accompanying drawings.

Figure 5:
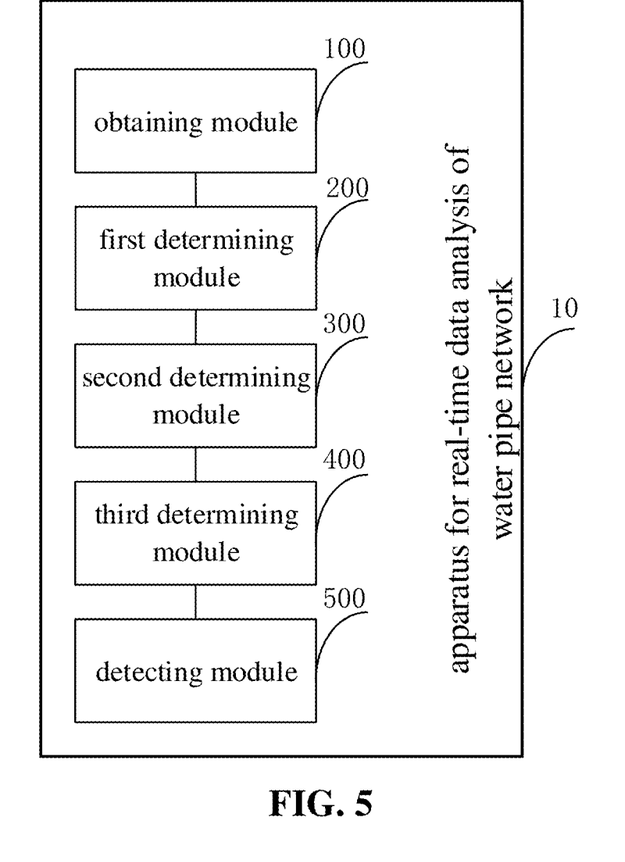
FIG. 5 is a schematic structural diagram of an apparatus for real-time data analysis of water pipe network according to an embodiment of the present disclosure.

FIG. 5 is a schematic structural diagram of an apparatus for real-time data analysis of water pipe network according to an embodiment of the present disclosure.

As shown in FIG. 5, the apparatus 10 includes: an obtaining module 100, a first determining module 200, a second determining module 300, a third determining module 400, and a detection module 500.

The obtaining module 100 is configured to obtain a current flow data $x_i$ to be identified, where i is a positive integer greater than or equal to 2.

The first determining module 200 is configured to determine whether a first difference between the current flow data $x_i$ to be identified and a previous identified flow data $x_{i-1}$ adjacent to the current flow data $x_i$ to be identified is less than or equal to a preset threshold, and wait to be outputted in response to the first difference being less than the preset threshold.

The second determining module 300 is configured to determine whether a second difference between a next to-be-identified flow data $x_{i+1}$ adjacent to the current flow data $x_i$ to be identified and the previous identified flow data $x_{i-1}$ is less than or equal to the preset threshold in response to the first difference being greater than the preset threshold, and wait to be outputted after correction in response to the second difference being less than or equal to the preset threshold.

The third determining module 400 is configured to determine whether a third difference between the current flow data $x_i$ to be identified and the next to-be-identified flow data $x_{i+1}$ is less than or equal to the preset threshold in response to the second difference being greater than the preset threshold, and wait to be outputted in response to the third difference being less than or equal to the preset threshold.

The detecting module 500 is configured to detect changing trends of the previous identified flow data $x_{i-1}$, the current flow data $x_i$ to be identified and the next to-be-identified flow data $x_{i+1}$ in response to the third difference being greater than the present threshold, wait to be outputted in response to the trend satisfying a preset condition, wait to be outputted after correction in response to the trend not fails to satisfy the preset condition, and obtain and output an analysis result after an output period is reached.

The apparatus 10 of the embodiment of the present disclosure obtains the analysis result by analyzing and processing real-time water flow data, and quickly and accurately recognizes any abnormal conditions in the running state of the water pipe network through the real-time change law of the flow, thereby effectively improving the accuracy and real-time performance of data analysis. Furthermore, the safe operation of the water pipe network is effectively ensured, which is simple and easy to implement.

Further, in an embodiment of the present disclosure, the apparatus 10 of the embodiments of the present disclosure further includes: a looping execution module. The looping execution module is configured to detect a current time, and in response to the current time satisfying a preset time period, to determine the current to-be-identified flow data as a new previous identified flow data, and determine the next to-be-identified flow data as a new current flow data to be identified, and continue to execute the obtaining module 100.

Further, in an embodiment of the present disclosure, the apparatus 10 of the embodiment of the present disclosure further includes: an alarm module. The alarm module is configured to detect whether the analysis result reaches an alarm condition, to generate an alarm signal in response to reaching the alarm condition, and to control the acoustic prompting device and/or the optical display device to give an alarm in response to the alarm signal.

Further, in an embodiment of the present disclosure, the identified flow data $x_1$ is a preset value; the preset condition is that: the previous identified flow data $x_{i-1}$, the current flow data $x_i$ to be identified and the next to-be-identified flow data $x_{i+1}$ continues to rise or continue to fall.

It should be noted that the foregoing explanation of the embodiment of the method for real-time data analysis of water pipe network is also applicable to the apparatus for real-time data analysis of water pipe network of this embodiment, and will not be repeated here.

According to the apparatus for real-time data analysis of water pipe network proposed by the embodiment of the present disclosure, the analysis result is obtained by analyzing and processing real-time water flow data, and any abnormal situation of the water pipe network operating state is quickly and accurately identified through the real-time change law of flow, and the change law of the water pipe network flow is analyzed and summarized. Based on real-time monitoring data, use the shortest time to judge the water use law, and use distortion recognition and correction technology to process, store and output abnormal data, which can quickly and automatically identify the flow change law of real-time monitoring data, and make relevant corrections and alarms. The method has good processing and display performance, the application is simple, the applicability is strong, the analysis and recognition accuracy is high, and the timeliness of emergency treatment is guaranteed.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "plurality" means at least two, such as two, three, etc., unless otherwise specifically defined.

In the description of this specification, descriptions with reference to the terms "one embodiment", "some embodiments", "examples", "specific examples", or "some examples" etc. mean specific features described in conjunction with the embodiment or example, structure, materials or features are included in at least one embodiment or example of the present disclosure. In this specification, the schematic representations of the above terms do not necessarily refer to the same embodiment or example. Moreover, the described specific features, structures, materials or characteristics can be combined in any one or more embodiments or examples in a suitable manner. In addition, those skilled in the art can combine and combine the different embodiments or examples and the features of the different embodiments or examples described in this specification without contradicting each other.

Although the embodiments of the present disclosure have been shown and described above, it can be understood that the above-mentioned embodiments are exemplary and should not be construed as limiting the present disclosure. Those of ordinary skill in the art can comment on the above-mentioned embodiments within the scope of the present disclosure. The embodiment undergoes changes, modifications, substitutions, and modifications.

What is claimed is:

1. A method for real-time data analysis of water pipe network, comprising:
   obtaining a current flow data $x_i$ to be identified, where i is a positive integer greater than or equal to 2;
   determining whether a first difference between the current flow data $x_i$ to be identified and a previous identified flow data $x_{i-1}$ adjacent to the current flow data $x_i$ to be identified is less than or equal to a preset threshold, and waiting to be outputted in response to the first difference being less than the preset threshold;
   determining whether a second difference between a next to-be-identified flow data $x_{i+1}$ adjacent to the current flow data $x_i$ to be identified and the previous identified flow data $x_{i-1}$ is less than or equal to the preset threshold in response to the first difference being greater than the preset threshold, and waiting to be outputted after correction in response to the second difference being less than or equal to the preset threshold;
   determining whether a third difference between the current flow data $x_i$ to be identified and the next to-be-identified flow data $x_{i+1}$ is less than or equal to the preset threshold in response to the second difference being greater than the preset threshold, and waiting to be outputted in response to the third difference being less than or equal to the preset threshold; and
   detecting changing trends of the previous identified flow data $x_{i-1}$, the current flow data $x_i$ to be identified, and the next to-be-identified flow data $x_{i+1}$ in response to the third difference being greater than the present threshold, waiting to be outputted in response to a trend satisfying a preset condition, waiting to be outputted after correction in response to the trend not failing to satisfy the preset condition, and obtaining and outputting an analysis result after an output period is reached.

2. The method of claim 1, further comprising:
   detecting a current time, and in response to the current time satisfying a preset time period, determining the current to-be-identified flow data as a new previous identified flow data, and determining the next to-be-identified flow data as a new current flow data to be identified, and continuing to obtain the current flow data $x_i$ to be identified.

3. The method of claim 2, further comprising:
   detecting whether the analysis result reaches an alarm condition; and
   generating an alarm signal when reaching the alarm condition.

4. The method of claim 3, further comprising:
   controlling an acoustic prompting device and/or an optical display device to give an alarm in response to the alarm signal.

5. The method of claim 1, wherein the identified flow data $x_1$ is a preset value.

6. The method of claim 1, wherein the preset condition is that: the previous identified flow data $x_{i-1}$, the current flow data x, to be identified, and the next to-be-identified flow data $x_{i+1}$ continues to rise or continue to fall.

7. An apparatus for real-time data analysis of water pipe network, comprising:
   one or more processors;
   a memory storing instructions executable by the one or more processors;
   wherein the one or more processors are configured to:
   obtain a current flow data $x_i$ to be identified, where i is a positive integer greater than or equal to 2;
   determine whether a first difference between the current flow data $x_i$ to be identified and a previous identified flow data $x_{i-1}$ adjacent to the current flow data x, to be identified is less than or equal to a preset threshold, and wait to be outputted in response to the first difference being less than the preset threshold;
   determine whether a second difference between a next to-be-identified flow data $x_{i+1}$ adjacent to the current flow data $x_i$ to be identified and the previous identified flow data $x_{i-1}$ is less than or equal to the preset threshold in response to the first difference being greater than the preset threshold, and wait to be outputted after correction in response to the second difference being less than or equal to the preset threshold;
   determine whether a third difference between the current flow data $x_i$ to be identified and the next to-be-identified flow data $x_{i+1}$ is less than or equal to the preset threshold in response to the second difference being greater than the preset threshold, and wait to be outputted in response to the third difference being less than or equal to the preset threshold; and
   detect changing trends of the previous identified flow data $x_{i-1}$, the current flow data $x_i$ to be identified, and the next to-be-identified flow data $x_{i+1}$ in response to the third difference being greater than the present threshold, wait to be outputted in response to a trend satisfying a preset condition, wait to be outputted after correction in response to the trend not failing to satisfy the preset condition, and obtain and output an analysis result after an output period is reached.

8. The apparatus of claim 7, wherein the one or more processors are configured to:
   detect a current time, and in response to the current time satisfying a preset time period, determine the current to-be-identified flow data as a new previous identified flow data, and determine the next to-be-identified flow data as a new current flow data to be identified, and continue to obtain the current flow data $x_i$ to be identified.

9. The apparatus of claim 8, wherein the one or more processors are configured to:
   detect whether the analysis result reaches an alarm condition, generate an alarm signal when reaching the alarm condition, and control an acoustic prompting device and/or an optical display device to give an alarm in response to the alarm signal.

10. The apparatus of claim 7, wherein,
    the identified flow data $x_1$ is a preset value; and
    the preset condition is that: the previous identified flow data $x_{i-1}$, the current flow data $x_i$ to be identified, and the next to-be-identified flow data $x_{i+1}$ continues to rise or continue to fall.

* * * * *